July 7, 1936.   J. ROBERTSON ET AL   2,046,486
SANITARY CONTAINER AND LID OPERATING MEANS THEREFOR
Filed March 16, 1934
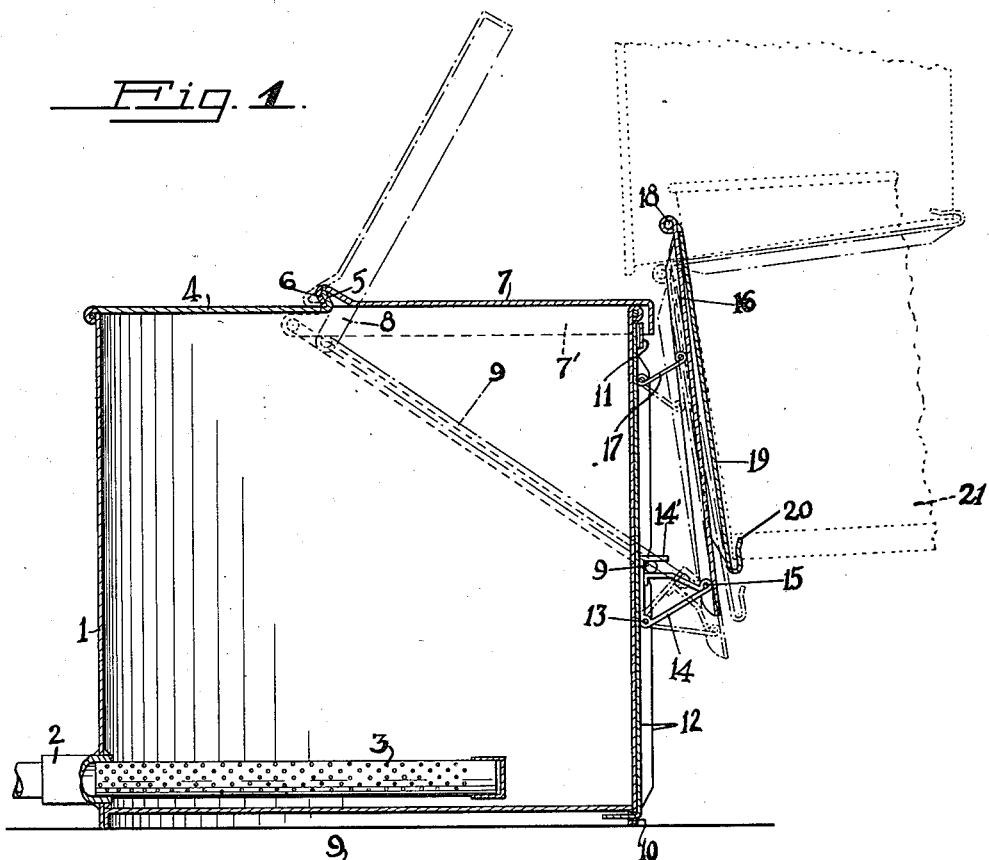
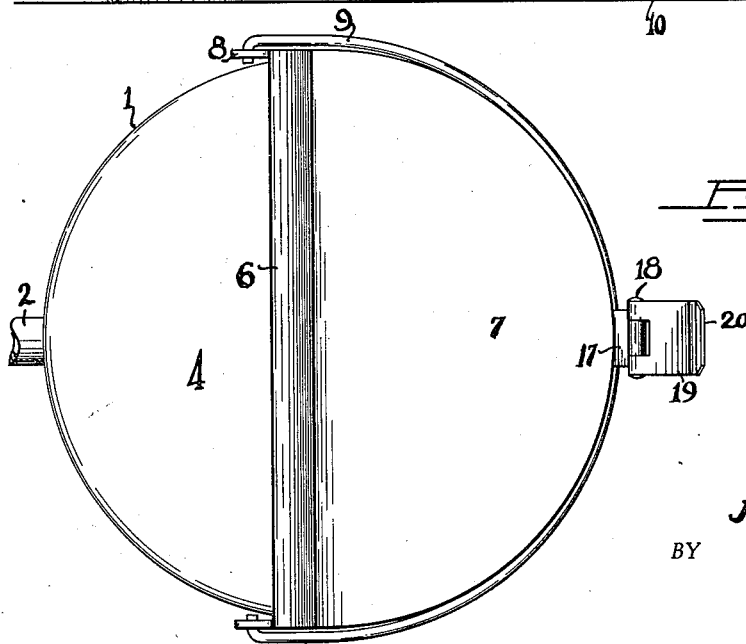
INVENTORS
JAMES ROBERTSON
GEORGE H. PURDY
BY
J. E. Prabucco
ATTORNEY Patented July 7, 1936

2,046,486

UNITED STATES PATENT OFFICE 2,046,486

SANITARY CONTAINER AND LID OPERATING MEANS THEREFOR

James Robertson and George H. Purdy, San Francisco, Calif.

Application March 16, 1934, Serial No. 715,900

4 Claims. (Cl. 220—36)

This invention relates to improvements in sanitary containers and lid operating means therefor.

An object of this invention is to provide an improved sanitary container having novel means for opening and closing the lid thereof.

The device comprising this invention obviates the necessity of a person setting down a pail containing milk or other material in order to use his hands to open a container into which the contents of the pail is to be deposited, as the device is so constructed that a pressure exerted by the weight of the pail automatically opens the lid of the container to permit the contents of the pail to be deposited in the container, and the lid automatically closed after the pressure of the pail is removed.

Another object of our invention is to provide a sanitary container having a novel carriage structure which is adapted for use in automatically raising and lowering the lid of the container and in facilitating the emptying of the contents of a pail into the said container while the lid is in a raised position.

A further object of our invention is to provide a sanitary milk container having a detachable strainer and drain pipe therein which may be readily removed for cleaning purposes.

A still further object of our invention is to provide a sanitary milk receptacle which is so designed that its lid may be automatically raised and lowered without the physical engagement of one's hands with any part of the device, thereby obviating one of the most common sources through which bacteria or germs are brought into engagement with the receptacle.

Other objects more or less apparent will present themselves or will be specifically pointed out in the description of our invention which is to follow.

In the accompanying drawing:

Fig. 1 is a central longitudinal section through a device embodying our invention and Fig. 2 is a top plan view of the device.

Referring to the drawing the numeral 1 designates a container of any suitable shape and construction having a discharge opening in its side wall adjacent its bottom which communicates with a discharge pipe 2. Removably extending into and frictionally attached to the discharge pipe, and preferably lying in a horizontal position just above the bottom of the container, is a perforated drain and strainer pipe 3 through which milk or other liquid deposited into the container must pass before entering the discharge pipe 2. The drain pipe may be readily removed for sanitation and cleaning purposes by manually pulling it in such a manner that its attached end is disengaged from the discharge pipe 2.

The top of the container is provided with a segment shape top plate 4 which partially closes the top end of the said container and is provided with an upturned flange 5 at its straight inner edge. Extending over and downwardly alongside the flange 5 is a co-operating flange 6 of a lid or cover 7 adapted to close the remaining portion of the upper end of the container 1. The two co-operating flanges 5 and 6 allow the lid to be raised about the said flanges as a pivot, also permitting the said lid to be quickly removed for cleaning or sanitation purposes without the use of tools or without the necessity of unscrewing nuts or bolts.

The curved or arcuate edge of the lid 7 is provided with a downturned flange 7', the oppositely disposed ends 8 of which project beyond the ends of the straight flange 6 of the said lid and are located in spaced relation to the side edges of the top plate 4. The projecting ends 8 of the flange 7' are each provided with a hole into which the hooked ends of a curved or other suitably shaped link member 9 extend. The curved link member extends in a downward sloping direction around a part of the side wall of the container but in spaced relation thereto.

A slotted flange 10 at the front lower edge of the container 1 and a bracket 11 secured to the side wall of the said container near its top front edge directly above the flange 10, serves to detachably mount a vertically disposed bar 12. The bar 12 is normally positioned in a vertical position against the front side wall of the container 1 with its lower inwardly bent end extending through the slot in the flange 10 and its upwardly disposed end extending between the bracket 11 and the side wall of the container. The flange 10 serves to support the bar 12, while the bracket 11 serves to prevent the top end of the said bar from being pulled away from the side wall of the container when a forward or a downward pressure is applied thereto.

Pivotally secured as at 13 to the bar 12 is a triangularly shaped member 14 which has an upwardly and forwardly disposed flange 14' extending from its top edge. The forwardly disposed part of the flange 14' is spaced from the top side of the triangularly shaped member 14, and located between the said flange and the said top side is the link member 9. When the triangular member 14 is moved about its pivot 13 in a downward direction, as indicated by the dotted lines in Fig. 1, the link member 9 is carried in a downward and forward direction, thereby causing the flange 8 of the lid 7 to be similarly moved so as to raise the lid above the opening in the top end of the container.

Pivotally secured as at 15 to the triangular member 14 at the forward apex of the latter, is a substantially upright rod 16 which is pivotally connected at a point just below its top end by a link 17 to the upper end of the bar 12. Pivotally attached to the top end of the rod 16, as at 18, is a swinging member 19, the lower free end of which is provided with an upwardly disposed flange 20.

In order to open the lid 7, a pail 21, containing milk or other material, is placed with its lower edge resting on and engaging with the flange 20 of the swinging member 19. The weight of the pail and its contents move the member 19 and the rod 16 in a downward direction, as indicated by the dotted lines of Fig. 1, thereby causing the triangular member 14 to be moved in a downward direction about its pivot 13. The flange 14' being carried forwardly and downwardly with the triangular member, pulls the link member 9 in the same direction, thereby causing the lid 7 to swing upwardly to open the top end of the container. So as to empty the contents of the pail 21 into the container while the lid is open, the bottom of the said pail is swung outwardly and upwardly while still having the greater part of its weight supported by the flange 20 of the swinging member 19. The engagement of the flange 20 with the bottom edge of the pail causes the member 19 to swing upwardly about the pivot 18 as the said pail is manually moved to a dumping position. After the contents of the pail are emptied into the container and the weight thereof is removed from the swinging member 19, the latter falls back against the rod 16. The force of gravity causes the lid 7 to move downwardly and automatically close the opening in the top end of the container, thereby actuating the link member 9, the triangular member 14, the rod 16 and the member 19 so they again resume their normal positions.

Various changes and modifications may be made in the details of construction without departing from the spirit of our invention.

Having described our invention what we claim is:

1. The combination comprising a container, a lid mounted for pivotal movement on the container, a semi-circular link member having its ends attached to lugs carried by the lid, a lever member pivotally mounted at the front of the container having means for engaging with the semi-circular link member, a movable rod pivotally attached to the lever member, and a swinging member pivotally attached to the rod, the said swinging member having means thereon for engaging with a part of a receptacle.

2. The combination comprising a container, a lid mounted for pivotal movement on the container, rearwardly disposed lugs carried by the lid and extending rearwardly beyond the pivotal connection of the lid and container, a semi-circular link member attached at its ends to the lugs of the lid, the said member extending around the front of the container, a lever member pivotally mounted at the front of the container for moving the semi-circular member, whereby the lid may be raised above the container, a substantially upright bar pivotally attached adjacent its lower end to the lever member, the said bar being movably attached adjacent its upper end to means for confining its movement within certain limits, and a swinging member pivotally attached to the upper end of the bar, the said swinging member having means thereon for engaging with a receptacle.

3. The combination comprising a container, a lid mounted for pivotal movement on the container, a projecting flange carried by the lid and extending to the rear of the pivotal connection of the lid and the container, a link member attached to the flange at a point to the rear of the said pivotal connection, and means for actuating the link member whereby the lid may be raised, the said means including a movable carriage member, a swinging member pivotally attached to the carriage member at a point above the top of the container and adapted to be moved by the weight of a receptacle placed thereon, and pivotal means interposed between the link member and the carriage member for actuating the link member when the carriage is moved.

4. The combination comprising a container having a lid pivotally mounted thereon, a rearwardly disposed lug carried by the lid, a link member connected to the lug, pivoted means mounted on the side wall of the container and connected to the link member, and an outwardly swinging receptacle supporting arm pivoted to said means at a point above the top of the container, the said means being adapted to be moved in a downward direction by the weight of a receptacle placed on said arm, whereby the link member may be actuated to raise the lid.

JAMES ROBERTSON.
GEORGE H. PURDY.